Aug. 27, 1940.　　　　G. SLAYTER　　　　2,212,528
METHOD AND APPARATUS OF MELTING AND FINING GLASS
Filed Dec. 28, 1935　　　5 Sheets-Sheet 2

Aug. 27, 1940.  G. SLAYTER  2,212,528
METHOD AND APPARATUS OF MELTING AND FINING GLASS
Filed Dec. 28, 1935    5 Sheets-Sheet 3

Aug. 27, 1940.   G. SLAYTER   2,212,528
METHOD AND APPARATUS OF MELTING AND FINING GLASS
Filed Dec. 28, 1935   5 Sheets-Sheet 5

James Slayter
INVENTOR.
BY Rule & Hoge
ATTORNEYS.

Patented Aug. 27, 1940

2,212,528

UNITED STATES PATENT OFFICE 2,212,528

METHOD AND APPARATUS OF MELTING AND FINING GLASS

Games Slayter, Newark, Ohio, assignor, by mesne assignments, to Owens-Corning Fiberglas Corporation, a corporation of Delaware Application December 28, 1935, Serial No. 56,527

24 Claims. (Cl. 49—54)

REISSUED
JUL 2 2 1941

My invention relates to improved methods and apparatus for melting and refining refractory and vitreous materials, such as a solution of metal oxides in silica, including glasses generally and similar substances which are melted and refined at high temperatures. The invention is herein particularly described as adapted and used in melting and fining glass, but it will be understood that the invention is not limited to such use but comprehends the treatment of various other substances.

An object of the invention is to provide a novel and practical apparatus by which the raw glass batch or the like is melted and fined rapidly and economically, with the expenditure of a comparatively small amount of heat and with a furnace or apparatus which is small as compared with furnaces of the type now in general use, of equal productive capacity.

A large proportion of the glass which is manufactured at the present day is melted and refined to tanks of many tons capacity. The raw materials are introduced into the furnace at one end thereof and melted by heat applied to the top surface of the melting mass. The glass as it is melted and refined moves forward slowly through the furnace, the mass usually being several feet in depth. By a slow refining process a large quantity of seeds or gas bubbles which permeate the mass are caused to rise to the surface of the glass and are dissipated. From the time the raw batch is introduced until it has been refined and withdrawn from the furnace is usually many hours. The great length of time required for fining is due in part to the fact that the seeds or gas bubbles are carried downward by convection currents to considerable depths during the melting process, a large portion of the gases being dissolved, due to the pressure to which they are subjected. Owing to the viscous and sluggish nature of the molten glass, the undissolved gases or seeds rise to the surface very slowly, where they are dissipated. The head of glass also causes a pressure on the submerged seeds, which reduces their size and increases the sluggishness and difficulty with which they escape. As the submerged portions of glass rise toward the surface, the dissolved gases are liberated to a large extent and again appear as seeds which must be removed to complete the refining process. During the melting and refining process, a large amount of the heat supplied to the glass is lost through radiation. A considerable amount is also lost by convection and by conduction through the furnace walls.

An object of my invention is to overcome these objections and provide a method and apparatus by which the raw glass batch may be rapidly melted and refined, by which heat losses may be reduced to a minimum and by which a large output of the refined product may be obtained with a very small furnace or apparatus as compared with furnaces now in general use. For the attainment of this object, the invention in its preferred form comprises a refractory furnace within which are placed electrically heated melting and refining elements constructed and arranged in a manner to permit a continuous melting, fining and discharge of the material introduced into the furnace.

A further object of the invention is to provide an arrangement by which the glass or other material, as it is melted, is caused to flow in sheet formation or a very thin stream over the heating element in a manner to permit the ready escape of seeds or gas bubbles. The invention further provides means whereby the sheet of glass flowing over the heating element is maintained at such high temperature that the glass is highly liquid and free from the usual surface layer of chilled glass which would prevent the ready escape of the seeds. The invention further comprehends a novel arrangement by which the raw materials as they are fed forward to the heating elements are interposed between the latter and the furnace walls in a manner to absorb practically all the heat transmitted from said elements without permitting any considerable amount of heat to reach the furnace walls, thereby preventing heat losses by radiation or by conduction through the furnace walls.

Other objects of the invention will appear hereinafter.

Referring to the accompanying drawings.

Figure 1:
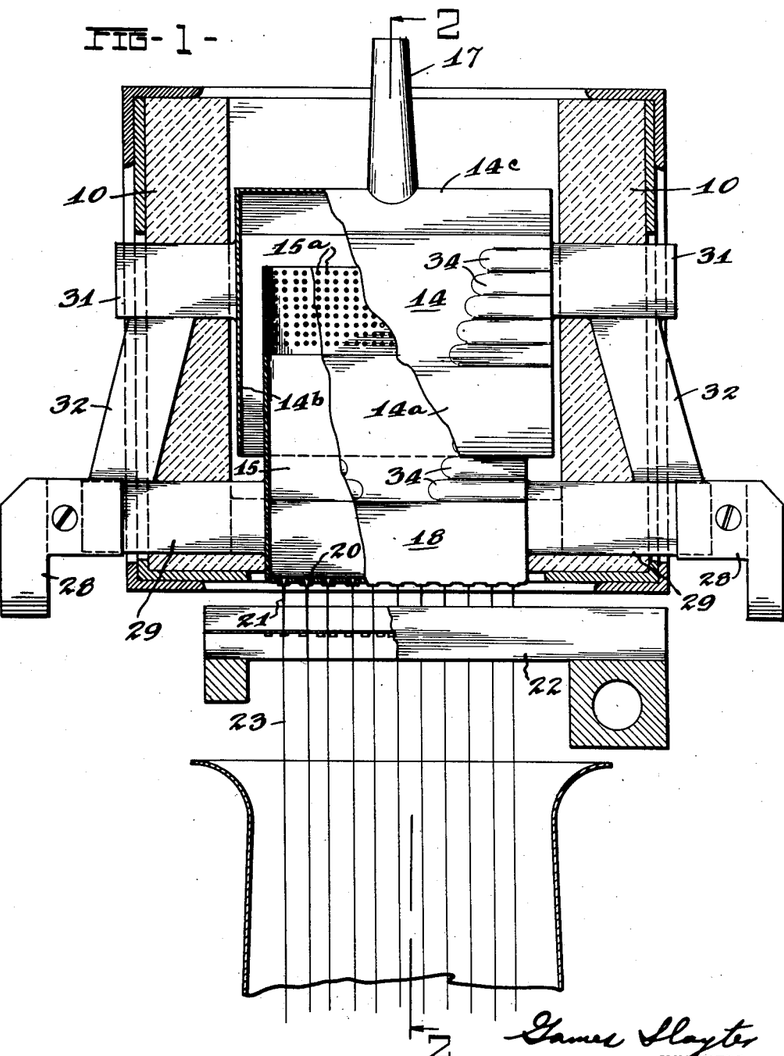
Fig. 1 is a part sectional side elevation of an electric furnace adapted for melting and fining glass, and associated means for reducing the refined molten glass to a fibrous condition as it leaves the furnace.
Figure 2:
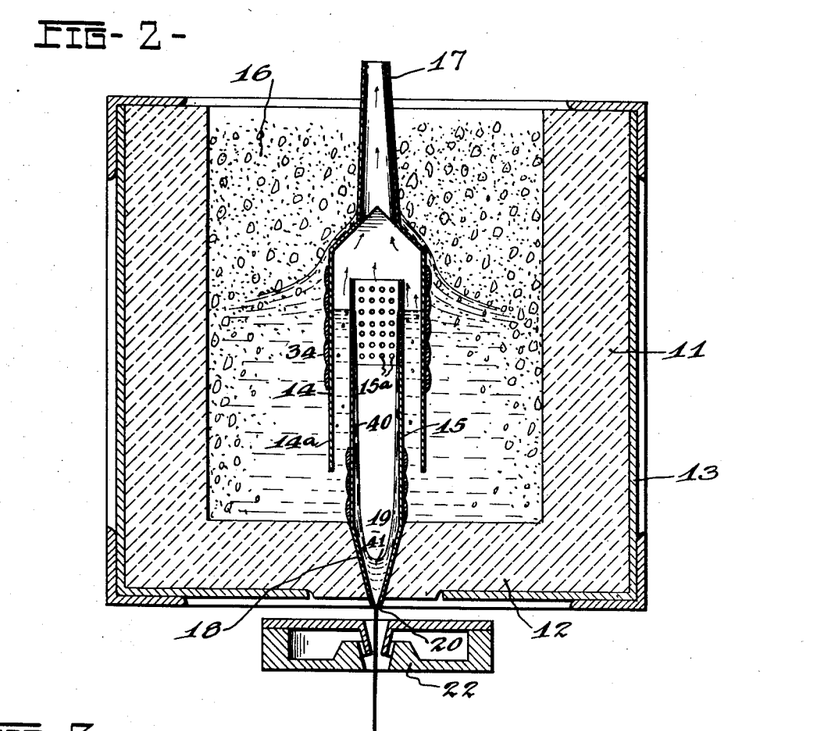
Fig. 2 is a cross sectional elevation of the same, the section being taken at the line 2—2 on Fig. 1.

Referring particularly to Figs. 1 and 2, the furnace comprises end walls 10, side walls 11, and a bottom 12, all made of refractory material and supported within a metal shell or casing 13. Within the furnace are located electrical resistors 14 and 15 which serve as heating elements for melting and refining the batch 16 which may consist, for example, of a mixture of raw materials and cullet such as are commonly used for making glass or like materials. The outer heating element 14 serves primarily for heating and melting the batch, while the inner heating element 15 serves as a fining element. These electrical resistors are made of a suitable metal or metal alloy adapted to withstand the high temperatures to which they are subjected, and resistant to the chemical action of the materials being acted upon. For the purpose of melting and fining glass, I preferably use a platinum-rhodium alloy. Very satisfactory results are obtained with an alloy comprising 90% platinum and 10% rhodium.

The outer heating element 14 is in the form of a housing surrounding and partly enclosing the inner heating element 15. Said housing includes vertical side walls 14$^a$, end walls 14$^b$, and a top cover portion or roof 14$^c$, the latter comprising upwardly and inwardly inclined converging walls. A stack or vent 17 extending upward from the roof provides for the escape of gases liberated during the melting and refining of the glass. The lower end of the housing 14 is open and spaced above the floor of the furnace.

The inner heating and refining element 15 comprises a body of rectangular construction including vertical side walls and end walls, parallel respectively with the side walls 14$^a$ and end walls 14$^b$ of the outer heating element and spaced a short distance inwardly therefrom. In the particular construction shown, the side walls of the element 15 extend vertically down to the floor of the furnace and thence are tapered downwardly and inwardly. These tapered walls provide a trough-shaped extension 18 which forms a lining or bushing for a correspondingly shaped opening or passageway extending downward through the floor 12 of the furnace. Said opening in the furnace floor forms a well 19 within which the refined glass accumulates as hereinafter described, and from which it is discharged through bottom outlet openings 20 formed in the bottom of the bushing 18.

The molten glass flows continuously through the outlets 20 in a row of small streams 21. These streams of molten, viscous glass are acted upon by a blower 22 by which the viscous streams are continuously drawn out and attenuated to the form of very fine fibers 23 which may be accumulated and formed into a mat or sliver, or otherwise treated. The blower 22 and other apparatus for treating the refined material after it leaves the furnace are not in themselves a part of the present invention and need not be set forth in detail. The refining element 15 is provided with a multiplicity of perforations or small openings 15$^a$ extending through the walls thereof, said openings being located in the upper portion of said walls. The upper portion of the refining element is thus in the form of a screen which permits the molten glass to flow therethrough but screens out the seeds or gas bubbles in a manner more fully set forth hereinafter.

Figure 5:
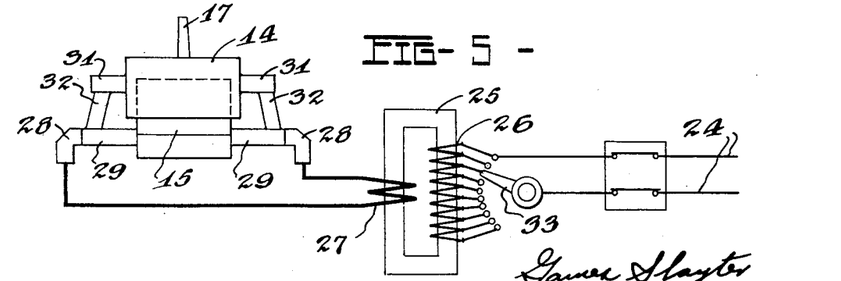
Fig. 5 is a diagrammatic view showing the electrical circuits.

The resistors 14 and 15 are electrically heated by means of an alternating current. The current may be supplied through conductors 24. A step-down transformer 25 has its primary winding 26 connected in circuit with the conductors 24 and its secondary winding 27 connected as by means of copper busbars 28 to terminals 29 of the resistor 15. The resistor 14 has terminals 31 which may be connected through conductors 32 with the terminals 29, the two resistor elements 14 and 15 being thereby connected in parallel in the secondary circuit of the transformer. The temperature to which the heating elements are raised is adjustably regulated and controlled by a rheostat 33.

Figure 4:
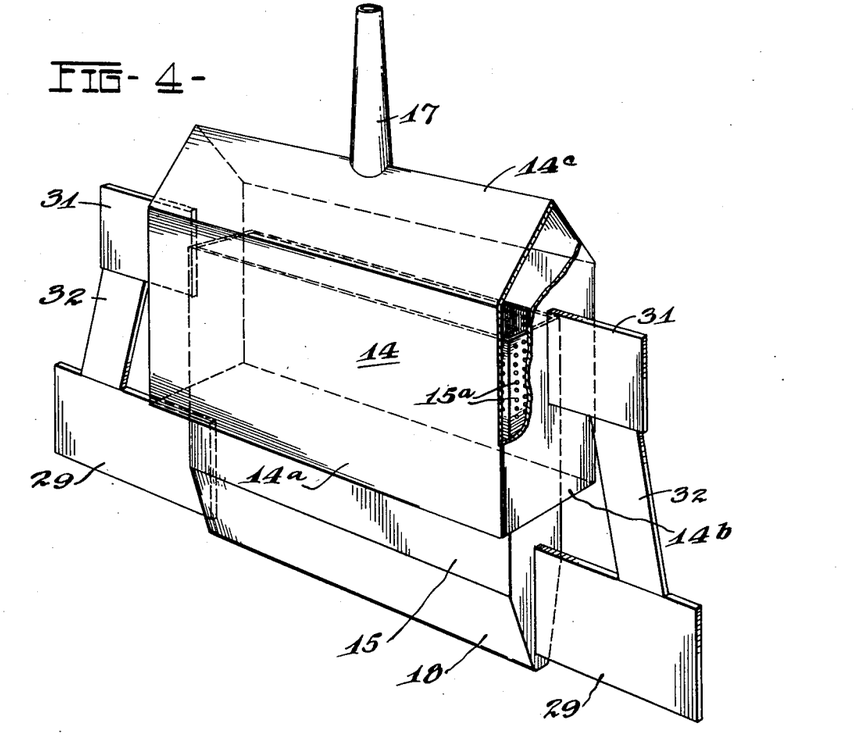
Fig. 4 is a perspective view of the electrical heating elements shown in Figs. 1 and 2.

A proper distribution of the electric current flowing through the heating elements is provided by building up certain portions of the walls by means of conducting material 34 covering certain portions of said walls. This material may be of the same material or composition as the walls themselves, and, as shown, consists of strips of such material welded or integrally united with said walls. It is found that when the walls are of uniform thickness throughout, there is an uneven distribution of the electric current flowing therethrough, and an uneven distribution of the heat produced by said current. There is a tendency toward excessive heating adjacent the terminals 31 and also a lack of sufficient heating of the lower portions of the walls 14$^a$. By a suitable distribution and arrangement of the conducting elements 34, this difficulty is overcome and satisfactory heat distribution maintained.

The operation of the apparatus shown in Figs. 1, 2, 4 and 5 may be described as follows: The batch 16 consisting of raw materials and which, if desired, may include a certain amount of cullet, is introduced through the top of the furnace and gradually works downward during the melting process. The walls 14$^a$ are maintained by the electric current at a sufficiently high temperature to melt the materials moving downward in contact therewith or closely adjacent thereto. Almost all of the heat radiated from the walls 14$^a$ is absorbed by the batch or materials interposed between the same and the opposite walls 11 of the furnace, so that practically no heat escapes to and through said walls. The molten glass passes beneath the lower end of the walls 14$^a$ and moves upward between said walls and those of the inner or refining element 15.

The passageway between the walls of the two heating elements is quite narrow so that the glass moves upward substantially in sheet formation and is raised to a high temperature at which it is in a highly liquid condition. This facilitates the ready escape of the seeds or gases formed therein.

The highly fluent glass passes through the screen or openings 15$^a$, said openings serving to screen out or prevent the passage therethrough of any gas bubbles or seeds. These seeds are retained in substantially spherical form owing to the surface tension which prevents them from elongating and passing through openings 15$^a$.

The glass which passes through the screen flows downward over the inner surface walls of the refining element 15 in the form of a thin layer or sheet 40 and accumulates in the well 18. This provides a pool or supply body 41 of refined glass which issues through the outlets 20 as heretofore described.

Because of surface tension, the gas which forms the small seeds is under considerable compression. This pressure has a tendency to cause the gas to go into solution in the glass. As the glass flows in a thin layer or sheet 40, the gas going into solution at the periphery of the seeds has only a very short distance to migrate to reach the surface of this sheet of glass and evaporates from such surface. In this manner, the small seeds very quickly disappear and are eliminated by the simple process of going into solution in the glass and evaporating from its surface.

This evaporation, moreover, takes place in a very highly heated chamber or medium which prevents a chilled skin or enamel forming on the surface of the glass and hindering such rapid evaporation. The temperature of the air or gaseous medium within the confines of the heating and fining elements is about equal to that of the glass flowing downward over the inner walls of the fining element 15.

A further feature which facilitates the rapid fining or removal of gases from the glass relates to the prevention or elimination of convection currents. The formation of such convection currents is practically eliminated due to the stationary surface over which the liquid moves being so close to all portions of the liquid itself that friction opposes the movement of any such currents which tend to form. This is in contrast with the usual refining methods in which the depth of the molten glass is relatively great so that convection currents are formed. These tend to submerge the gas-laden glass to depths at which hydrostatic pressure is developed to a degree sufficient to either force the gas content in the bubbles into solution or prevent their free escape from the molten mass.

It will be observed that the glass forming materials are caused to move in a zigzag path during the melting and refining process. The raw batch first moves downward along the exterior surface of the melting element 14, thence upward between the walls of the melting and fining elements, and then downward within the walls of the inner or refining element 15. During this movement the material is subjected to graduated temperature zones, the lowest temperature being exterior of the outer heating element and the highest temperature at the inner surface of the refining element.

The sheet of glass 40 as it flows down the inner wall surfaces of the refining element, is raised to a higher temperature than that required in the pool 41. This excess heat is transferred outwardly through the walls 15 to the surrounding glass and assists in raising the temperature of the latter, particularly that portion which is moving upwardly between the walls of the melting and refining elements.

Figure 3:
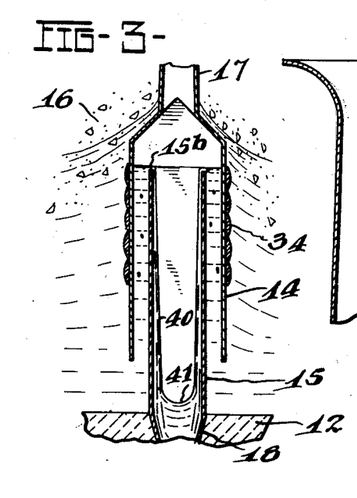
Fig. 3 is a fragmentary view showing a modified form of the inner heating element.

Fig. 3 shows a modification in which the refining element 15 is not provided with perforations 15ª as in the form shown in the other figures. The molten glass, therefore, rises between the walls of the inner and outer heating elements and flows over the top edge 15ᵇ of the refining element in the form of a thin stream or sheet. Any seeds or bubbles, unless extremely minute, as they pass over the edge 15ᵇ are stretched in a manner to cause them to burst and are thus dissipated. Any minute seeds and any gases in solution passing downward on the inner surface of the refining element 15 are evaporated or dissipated in the manner above described.

Figure 6:
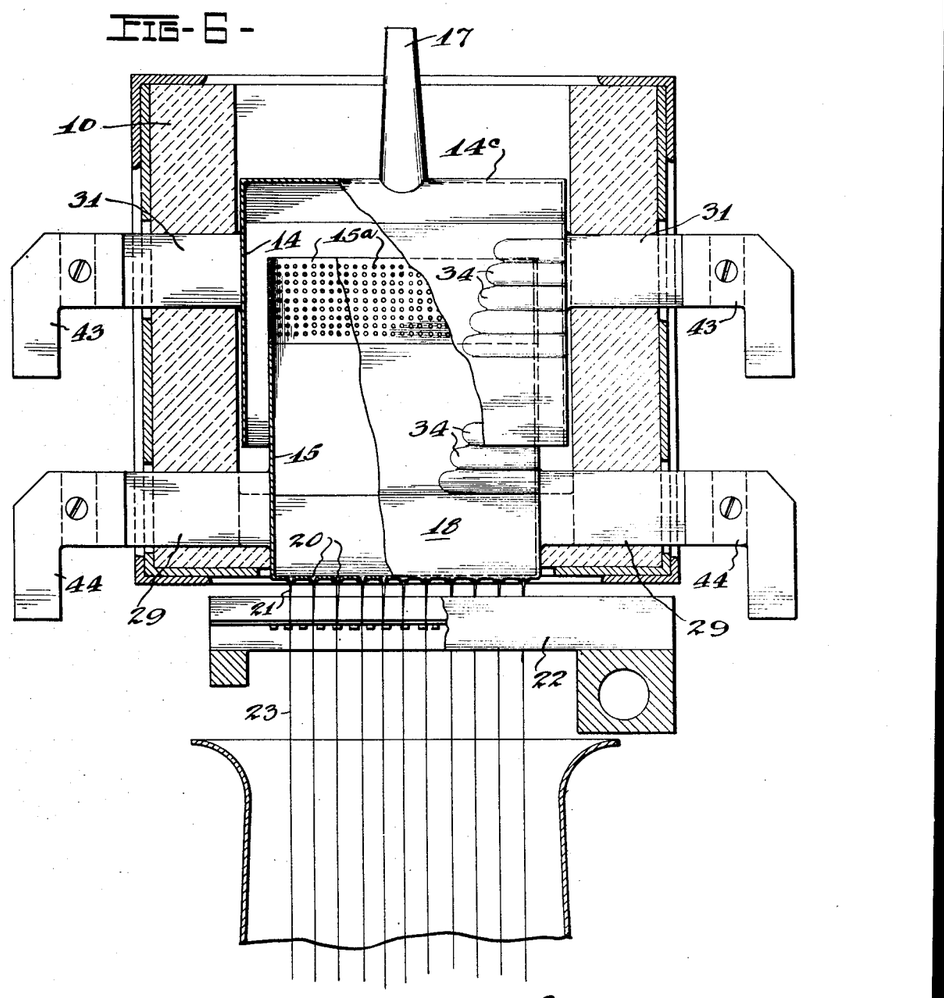
Fig. 6 is a view similar to Fig. 1, showing a modification of the electrical connections.

Fig. 6 illustrates a modified construction in which the inner and outer heating elements may be connected in separate electrical circuits and their temperatures independently controlled. As shown, the terminals of the outer heating element 14 are provided with connector blocks 43 for connecting it in circuit with a heating transformer. The terminals of the inner heating or refining element 15 are provided with connector blocks 44 by which connection may be made with a separate transformer or other source of electric current.

Figures 7, 8:
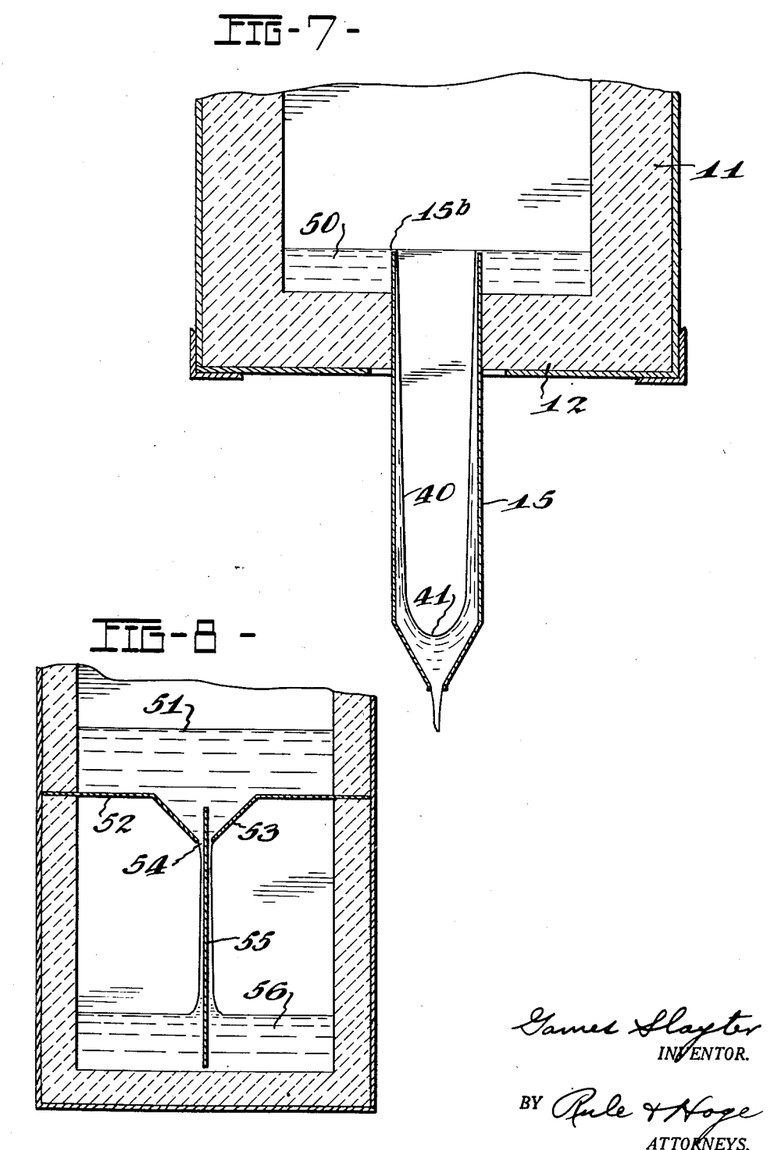
Fig. 7 is a sectional elevation of a modified construction in which the electrical heating element extends below the melting furnace.
Fig. 8 is a sectional elevation showing a further modification.

Fig. 7 illustrates a modified construction in which the heating and refining element 15 extends downward below the floor 12 of the furnace, the upper end of said element being a short distance above the floor. The molten glass accumulates and forms a pool 50. The glass may flow continuously over the upper edge 15ᵇ and downward in the form of a sheet 40 over the inner walls of the heating element. The latter serves to refine the glass in the manner heretofore described.

Fig. 8 shows a further modification in which the pool of glass 51 is supported on a false bottom or platform 52 located some distance above the floor of the furnace. The support 52 includes downwardly convergent sections 53 terminating in a narrow passageway or slot 54. An electrical resistor 55 consisting of a platinum-rhodium alloy or other suitable material, and which may be in the form of a flat plate or sheet, extends vertically downward through the slot 54. The resistor 55 is electrically heated and maintained at a high temperature. The glass flows downward through the slot 54 and in sheet formation over the opposite surfaces of the resistor, the glass being refined in the manner heretofore described in connection with the refining element or resistor 15. The refined glass accumulates and forms a pool 56. The refined glass can be drawn or discharged from the furnace through any suitable outlet or in any approved manner. If desired, the platform 52 may be made of sheet metal or alloy and electrically heated to thereby assist in the melting and refining of the glass.

Modifications may be resorted to within the spirit and scope of my invention.

I claim:

1. The method of melting and fining glass which comprises providing a mass of batch, applying localized heat to an interior zone of the mass and thereby gradually melting interior portions of the mass, and causing the molten material to move in a zigzag path toward the center of said zone.

2. The method of melting and fining glass which comprises providing a mass of batch, applying localized heat to an interior zone of the mass and thereby gradually melting interior portions of the mass, causing the molten material to move in a zigzag path toward the center of said zone, and progressively increasing the temperature to which the material is subjected as it moves towards said center.

3. Apparatus for melting and fining refractory materials, comprising a container for a batch of the raw materials, heating elements within said container in position to be surrounded by the batch, said heating elements being arranged one within another, and means for heating said elements and causing the batch to be melted and to flow between said elements, the inner of said elements providing an interior chamber surrounded by the outer of said elements, said elements being arranged to cause the molten material to flow into said chamber and over the walls thereof in sheet formation.

4. Apparatus for melting and fining refractory materials, comprising a container for a batch of the raw materials, heating elements within said container in position to be surrounded by the batch, said heating elements being arranged one within another, means for heating said elements and causing the batch to be melted and to flow between said elements, the inner of said elements providing an interior chamber surrounded by the outer of said elements, said elements being arranged to cause the molten material to flow into said chamber and over the walls thereof in sheet formation, means for directing gases which escape from the molten material, to the exterior of the container, means providing a reservoir in which the molten material accumulates, and means for discharging the material from said reservoir.

5. An electric melting and refining furnace comprising refractory walls providing a melting and fining chamber, a melting element within said chamber, a fining element within said melting element, said elements arranged to provide a passageway therebetween, and means for heating said melting element and causing it to gradually melt batch within the said chamber, and causing the molten material to flow between the walls of the melting and fining elements, said fining element being formed to provide a fining chamber positioned interiorly of the heating element and into which the molten material flows after passing between the walls of said elements.

6. An electric melting and refining furnace comprising refractory walls providing a melting and fining chamber, a melting element within said chamber, a fining element within said melting element, said elements arranged to provide a passageway therebetween, means for heating said melting element and causing it to gradually melt batch within the said chamber, and causing the molten material to flow between the walls of the melting and fining elements, said fining element being formed to provide a fining chamber positioned interiorly of the heating element and into which the molten material flows after passing between the walls of said elements, and a screen through which the molten material flows into said interior chamber and by which seeds or gas bubbles are screened out of the material entering the fining chamber.

7. Apparatus for melting and fining refractory materials, said apparatus comprising a container for the raw materials, an electrical resistor forming a fining chamber positioned within said container, said chamber being open at its upper end, an electrical resistor forming a melting element, the latter being in the form of a hood enveloping said fining chamber, the walls of said hood projecting downward along the walls of the fining chamber and spaced therefrom to provide a passageway, and means for supplying electric current to said resistors whereby the batch surrounding the melting element is gradually melted and caused to move upward through said passageway and into said chamber and down the inner wall surfaces of the latter in sheet formation.

8. Apparatus for melting and refining glass or other materials, said apparatus comprising a furnace tank to receive the raw materials, means providing a refining chamber within and surrounded by said tank with the walls of said chamber spaced inwardly from the walls of the tank, means for supplying localized heat within and around said chamber and thereby melting surrounding portions of the batch within the tank, and means for causing the molten material to enter said refining chamber and flow in thin stream or sheet formation over the interior wall surfaces of said chamber.

9. Apparatus for melting and refining glass comprising a furnace tank having refractory walls, an electrical resistor located within said furnace and spaced inwardly from the furnace walls, means for heating said resistor and for melting surrounding batch and causing the batch, after it is melted, to flow in sheet formation over the surface of said resistor, and means cooperating with the resistor to provide a highly heated gaseous medium enveloping said flowing material.

10. Apparatus for melting and refining glass, comprising a furnace tank to contain glass batch, means providing a refining chamber within and surrounded by said tank with the walls of said chamber spaced inwardly from the walls of the tank, said chamber extending upwardly from the floor of the tank, means for supplying heat to a localized zone within the tank, whereby portions of the batch in the tank which are within said zone and surrounding said chamber are gradually melted, and means for directing the molten material into said refining chamber adjacent the upper end thereof and causing the molten material to flow downward in sheet formation over the interior wall surface of the refining chamber.

11. Apparatus for melting and refining glass, comprising a furnace tank to contain glass batch, means providing a refining chamber within and surrounded by said tank with the walls of said chamber spaced inwardly from the walls of the tank, said chamber extending upwardly from the floor of the tank, means for supplying heat to a localized zone within the tank, whereby portions of the batch in the tank which are within said zone and surrounding said chamber are gradually melted, means for directing the molten material into said refining chamber adjacent the upper end thereof and causing the molten material to flow downward in sheet formation over the interior wall surface of the refining chamber, means providing a reservoir at the lower end of said refining chamber in which the refined molten glass accumulates, and means for discharging the glass from said reservoir.

12. The method of melting and refining glass or similar material which comprises subjecting a mass of a composition which will yield said material to localized heat applied thereto in sufficient amount to gradually melt the mass, causing the molten material to flow over a surface in a thin layer or sheet with the outer surface of said flowing layer exposed to a gaseous medium, and subjecting the molten material while flowing over said surface, to a sufficiently high temperature to prevent surface chilling and to cause a fining of the glass while in contact with said surface.

13. The process of refining molten glass or similar material, which comprises flowing the molten material in a thin layer and in a gaseous medium, over a surface maintained at a high temperature by heat supplied independently of the said material flowing thereover, and maintaining said medium at a sufficiently high temperature to prevent surface chilling of the material and thereby permit evaporation of dissolved gases and fining of the material as it flows over said surface.

14. The process of refining molten glass or similar material, which comprises flowing the molten material in a thin layer within a gaseous medium, over a surface electrically heated to a temperature sufficiently high to impart heat to the material flowing thereover and thereby maintaining said material in a fluent condition, and thereby preventing surface chilling of said material and permitting evaporation of gases dissolved in said material.

15. The method of refining molten glass or other molten material, which comprises flowing the molten material in a thin layer over a surface maintained at a high temperature by heat supplied independently of the said flowing material, maintaining said material while flowing over said surface in a gaseous medium having a temperature at least approximately as high as that of the flowing material, and thereby preventing surface chilling of said material and permitting evaporation of gases dissolved in said material.

16. Apparatus for melting and fining refractory materials, comprising a container for a batch of raw materials, heating elements within the container in position to be substantially surrounded and enclosed by the batch, said heating elements being arranged one within another, the inner heating element being in the form of an interior chamber having vertically disposed side walls and being open at its upper end, the other heating element being in the form of a hood or housing surrounding said inner element, said hood having side walls spaced outwardly from the side walls of the inner element and having a top cover portion, said heating elements forming electrical resistors, means for electrically heating said elements to a high temperature and thereby causing a gradual melting of the raw materials and a flow of the molten material upwardly between the spaced walls of the heating elements and thence downwardly in thin sheet formation over the inner wall of the inner heating element.

17. The method of melting and fining materials in the production of glass and similar products, which comprises establishing a high temperature zone in the interior of a mass of the unmelted material, causing the material to gradually enter said zone and be melted by the heat supplied within said zone and form a pool of molten material within said zone, causing the molten material to flow from said pool in thin sheet formation through a gas filled space or enclosure within said zone with an entire major surface of the sheet of flowing material bare and exposed to said gas, raising the temperature of the material to a sufficiently high degree to reduce the material to a substantially liquid form and thereby causing occluded or adsorbed gases to evaporate and entrained seeds or bubbles to escape through said exposed surface of the fluent material while flowing in said sheet formation.

18. A method as defined in claim 17, wherein the fluent material as it flows through said space is directed by and maintained in contact with a surface heated to a sufficiently high temperature to produce and maintain said liquid condition of the material flowing thereover.

19. The method of melting and refining glass or other material which comprises, subjecting a mass of batch to a high temperature by which the material is melted, flowing the molten material in sheet formation and screening out of the flowing sheet material, seeds or gas bubbles, and causing the molten material, after being screened, to flow over a highly heated surface and thereby causing dissolved gases to be evaporated from the material while flowing over said surface.

20. The method of melting and refining glass or other material which comprises subjecting a mass of batch to a high temperature by which the material is melted, flowing the molten material in sheet formation and screening out of the flowing sheet material, seeds or gas bubbles, and causing the molten material, after being screened, to flow over a highly heated surface and within a highly heated medium, whereby the formation of a chilled surface layer or skin on the flowing material is prevented and thereby causing dissolved gases to be evaporated from said material while flowing over said surface.

21. The method of melting and refining glass which comprises defining a gas filled space within an interior zone of a mass of batch, supplying localized heat to said interior zone of the batch and applying it to the batch in sufficient amount to gradually melt the batch, causing the material to flow in a thin layer over a surface within said zone and exposed to the gas in said space, applying heat to said surface independently of the heat in the glass and thereby imparting heat to the glass through said surface, and maintaining the gas in said space at a sufficiently high temperature to prevent surface chilling of the glass flowing over said surface and thereby causing dissolved gases to evaporate from the glass.

22. The method of melting and refining glass or similar material which comprises defining a gas filled space within an interior zone of a mass of batch, supplying localized heat to said interior zone of the batch and applying it to the batch in sufficient amount and at a temperature to gradually melt the batch, causing the batch as it is melted to form a pool, causing the molten material to flow from said pool in a thin exposed layer over a surface within said zone with the surface of said layer exposed to the gas in said space, maintaining said first mentioned surface at a temperature above that of the material flowing thereover, and maintaining said gas to which the molten material is exposed while flowing over said first mentioned surface at a temperature substantially as high as that of the flowing material.

23. The method of melting and refining glass or other materials which comprises subjecting an interior portion of a mass of batch to localized heat electrically generated within the boundaries of a predetermined zone in the interior of said mass and thereby gradually melting the batch, causing the melted batch to come in contact with an electrically heated surface within said zone and spaced inwardly from said boundaries, flowing the molten material in a thin exposed layer or sheet over and in contact with said surface in a gaseous medium within said zone, with one surface of said sheet uncovered and exposed to said gaseous medium, and maintaining said first mentioned surface and said gaseous medium at a sufficiently high temperature to maintain the sheet of material flowing thereover in a highly fluent condition, thereby causing dissolved gases to be evaporated from the material while flowing over said heated surface.

24. The method of melting and refining glass which comprises applying heat locally to an interior portion of a mass of batch and thereby melting said portion, and causing the molten material to flow in a thin layer or sheet over an electrically heated surface within said mass, with one surface of the flowing sheet directly in contact with and supported by said heated surface, and the other surface of said sheet overspread by a gaseous medium at a temperature substantially as high as that of the material while the latter is flowing over said heated surface, and thereby causing seeds or gas bubbles to escape from said sheet of molten material and gases in solution to evaporate while the material is flowing over said heated surface.

GAMES SLAYTER.